United States Patent
Bahry et al.

(10) Patent No.: US 6,824,038 B2
(45) Date of Patent: Nov. 30, 2004

(54) METHOD AND TOOL FOR ALIGNING PIPING COMPONENTS

(76) Inventors: Joseph M. Bahry, 4060 Broadoaks Drive, Thunder Bay Ontario (CA), P7J 1A7; Milan John Milkovich, Jr., 323 Riviera Drive, Thunder Bay Ontario (CA), P7B 6K4

( * ) Notice: Subject to any disclaimer, the term of this patent is extended or adjusted under 35 U.S.C. 154(b) by 0 days.

(21) Appl. No.: 10/200,294

(22) Filed: Jul. 23, 2002

(65) Prior Publication Data

US 2004/0016790 A1 Jan. 29, 2004

(51) Int. Cl.[7] .................. B23K 37/04; B23K 37/00; B25B 27/14
(52) U.S. Cl. .................. 228/49.3; 228/44.3; 228/212; 29/281.1; 269/47
(58) Field of Search .................. 228/44.3, 44.5, 228/47.1, 49.1, 49.3, 212; 29/281.1, 281.5; 269/43, 47, 50

(56) References Cited

U.S. PATENT DOCUMENTS

| | | | |
|---|---|---|---|
| 3,705,453 A | | 12/1972 | Olson |
| 3,898,714 A | * | 8/1975 | McFadden .................. 29/281.1 |
| 3,925,854 A | | 12/1975 | McFadden |
| 4,323,752 A | * | 4/1982 | Paton et al. .................. 219/101 |
| 4,483,059 A | | 11/1984 | Dearman |
| 4,553,305 A | | 11/1985 | Dearman |
| 4,611,830 A | * | 9/1986 | von Ahrens .................. 285/22 |
| 5,104,102 A | * | 4/1992 | Buxton .................. 269/43 |
| 5,118,024 A | | 6/1992 | McClure |
| 5,535,938 A | * | 7/1996 | Leduc .................. 228/212 |
| 6,039,235 A | | 3/2000 | Prissadachky |
| 6,427,602 B1 | * | 8/2002 | Hovis et al. .................. 104/138.1 |
| 2001/0038205 A1 | * | 11/2001 | Gowing .................. 285/80 |
| 2003/0047650 A1 | * | 3/2003 | Schnorrer .................. 248/62 |

FOREIGN PATENT DOCUMENTS

| | | |
|---|---|---|
| DE | 42 05 684 | 8/1993 |
| WO | WO 02/49800 | 6/2002 |

* cited by examiner

*Primary Examiner*—L. Edmondson
(74) *Attorney, Agent, or Firm*—Ryan W. Dupuis; Adrian D. Battison; Michael R. Williams

(57) ABSTRACT

A pipe aligning tool is provided for providing proper alignment and spacing between two piping components to be welded together in an end to end abutted relationship. The tool includes a spacer lying in a single plane for positioning between the ends of the piping components to provide the proper spacing. A pipe locator in the form of two projections, projects perpendicularly outwardly from each side of the spacer for concentric alignment of piping components on opposing sides of the spacer when abutted with the respective pipe locators. The simple construction of the tool permits two piping components to be both concentrically aligned and properly spaced for welding in a simple task which can be manually performed without depending upon visual alignment by the user.

19 Claims, 5 Drawing Sheets

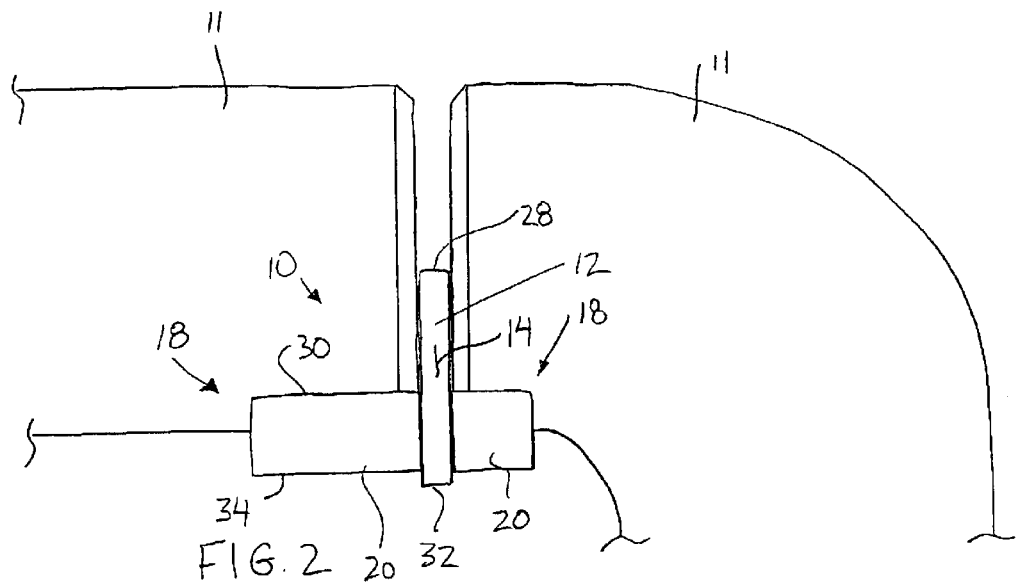
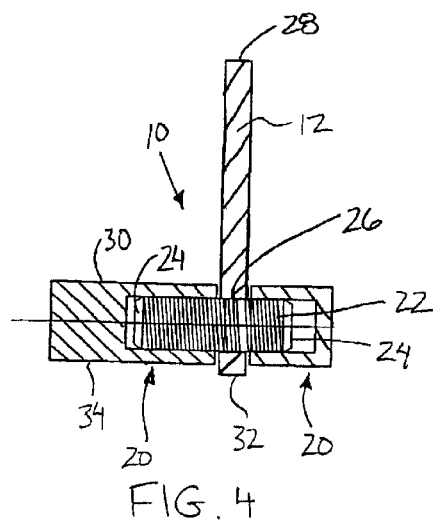

METHOD AND TOOL FOR ALIGNING PIPING COMPONENTS

FIELD OF THE INVENTION

The present invention relates to a tool and a method of use of the tool for aligning adjacent piping components of a spool of piping components which are to be welded together in alignment with one another.

BACKGROUND

When welding piping components together, including straight elongate pipe sections or curved fittings and the like, it is important for the abutted piping components to be aligned concentrically with one another in order to form an even welded joint about a periphery of the piping components. It is also important to have a slight gap between the piping components before welding to permit root bead pass material to penetrate between the abutted ends of the piping components. Typically the piping components are manually supported within the required configuration before welding, however it is difficult to properly align the piping components with one another when this task is performed visually.

The use of clamps are known for securement about the periphery of two piping components for concentric alignment thereof, however these devices are generally intended as an aid for a welder to eliminate the requirement of a second person for holding the pipe and are typically not intended for providing proper spacing and alignment of the piping components readily in a single operation. Examples of clamps are found in U.S. Pat. No. 6,039,235 to Prissadachky and U.S. Pat. No. 3,925,854 to McFadden, neither of which are suitably arranged to provide a controllable degree of spacing between piping components. U.S. Pat. No. 5,118,024 to McClure provides a further example of a clamp for piping components in which spacing between the components can be controlled, however awkward manipulation of a considerably complex linkage of threaded members is required in order to do so.

U.S. Pat. Nos. 4,553,305 and 4,483,059 both to Dearman each provide a tool to assist in spacing of piping components to be welded, however the tool is only adapted for use in piping components in which one piping component is slidably received within a collar at the end of the other piping component. A clamping arrangement is secured on one side of a spacer element for clamping the tool onto only one of the tool piping components so that the tool would not be capable of aligning two piping components which are abutted end to end as is typically required when welding piping components together.

SUMMARY

According to one aspect of the present invention there is provided a pipe alignment tool for alignment of two adjacent piping components of a spool of piping components to be welded together, the tool comprising:

a spacer which is contained within a spacer plane for abutment between respective ends of the piping components; and a pipe locator supported on each side of the spacer which projects outwardly from the spacer plane, transversely thereto, the pipe locator on one side of the spacer being substantially aligned with the pipe locator on the opposing side of the spacer.

The use of a planar spacer for abutment between respective ends of the pipes, which includes a pipe locator on each side thereof, can be readily held in place between the abutted pipes to ensure proper spacing therebetween while the pipe locators ensure that the pipes are concentrically aligned with another on opposing sides of the spacer. The tool as described is simple in construction while being readily used, quickly and easily by a person manually manipulating the piping components to be welded.

Each pipe locator may be arranged to engage partway about a periphery of a respective piping component.

Preferably, each pipe locator comprises a pair of projections spaced apart from one another and extending outwardly from the respective side of the spacer.

The projections on opposing sides of the spacer are preferably in respective alignment with one another.

In a preferred embodiment, the spacer spans the pair of projections on each side thereof and beyond the projections in the form of a flat plate member supporting the projections thereon.

In some instances, when the projections are generally cylindrical in shape, the projections on one side of the spacer may have a varying diameter than the projections on the opposing side of the spacer for the purposes of concentrically aligning piping components which have some slight variance in actual dimensions relative to one another. In normal use however, the projections would normally be aligned and have substantially identical dimensions on both sides of the spacer.

Preferably projections of each pair are adjustable in spacing relative to one another.

When the projections include an inner side for engaging a respective piping component which faces an inner edge of the spacer and an outer side opposite the inner side which faces an outer edge of the spacer, mounting of the projections is preferably arranged such that spacing from the inner edge of the spacer increases as spacing between the projections within each pair of projections increases.

The pipe locators are preferably secured to the spacer by threaded fasteners so as to be selectively separable and replaceable with different size pipe locators. The pipe locators on opposing sides of the spacer may be commonly mounted using the threaded fasteners.

The pipe locators on opposing sides of the spacer may project outward at different distances from the spacer to accommodate for flanges, curved piping components and the like. To accommodate most flanges and curved piping components, the pipe locator on at least one side of the spacer projects substantially perpendicularly outward from the spacer a distance which is generally between 10 millimeters (mm) and 14 mm from the spacer. Ideally the projections are at least 10 mm in length beyond the spacer surface for clearance of the bevelled edge commonly found at the end of piping components to be abutted against the spacer. Ensuring that the projections have a preferred maximum length of 14 mm, but ideally less than 12 mm, provides projections which will not interfere with the curvature of the outer side walls of most curved piping components and the varying outer dimensions of most flanges.

The spacer may have a thickness generally in the range between $\frac{1}{16}$ of an inch and $\frac{5}{32}$ of an inch, although a thickness in the range of $\frac{3}{32}$ of an inch to $\frac{1}{8}$ of an inch is preferred for proper spacing between the piping components to be welded.

According to a further aspect of the present invention there is provided a method of aligning two adjacent piping components of a spool of piping components to be welded together, the method comprising:

providing an alignment tool having a spacer which is contained within a spacer plane and pipe locators projecting outward from respective sides of the spacer transversely to the spacer plane, in respective alignment with one another;

abutting an end of a first piping component against one side of the spacer;

engaging a periphery of the first piping component with the respective pipe locator on the same side of the spacer;

abutting an end of a second piping component against the other side of the spacer;

aligning the second piping component concentrically with the first piping component by engaging a periphery of the second piping component with the respective pipe locator on the same side of the spacer.

Once the piping components are substantially concentrically aligned with one another at a point of abutment, the piping components can be tacked together at one location about the periphery by welding so that the tool is no longer required to be held in place. The piping components are then aligned to extend in proper longitudinal alignment with one another so that the longitudinal axes of the respective piping components are coincident with one another, at which point further tacking and welding of the piping components may be accomplished.

The piping components, when abutted in alignment with the tool, remain freely rotatable about a respective longitudinal axis in relation to each other. This is particularly useful, for example, for orienting the direction of a 90 degree curved piping component in relation to a straight pipe section while the piping components remain aligned for subsequent tacking and welding.

When the pipe locator on each side of the spacer comprises a pair of projections which extend outward from the spacer at spaced positions from one another, the method may include adjusting a spacing between the projections of each pair to accommodate varying diameters of piping components. More specifically, the method may include adjusting spacing between the projections of each pair within a range between a radius and a diameter of the piping components to be welded.

When the pipe locator on each side of the spacer comprises a pair of projections, the projections on one side of the spacer being concentrically aligned with respective projections on the other side of the spacer, the method may include increasing diameter of the projections on one side of the spacer in relation to the other side of the spacer when piping components to be welded which are designated as being the same size, have slightly different actual diameters.

When the pipe locator on one side of the spacer projects from the spacer a shorter distance than the pipe locator on an opposing side of the spacer, the method preferably includes abutting a flange, a curved piping component or some other piping component which is other than straight, against the side of the spacer having the pipe locator which projects the shortest distance from the spacer.

BRIEF DESCRIPTION OF THE DRAWINGS

In the accompanying drawings, which illustrate an exemplary embodiment of the present invention:

FIG. 2 is an end elevational view of two piping components being aligned by the tool before welding.

FIG. 4 is a sectional view along the line 4—4 of FIG. 3.

DETAILED DESCRIPTION

Figure 1:
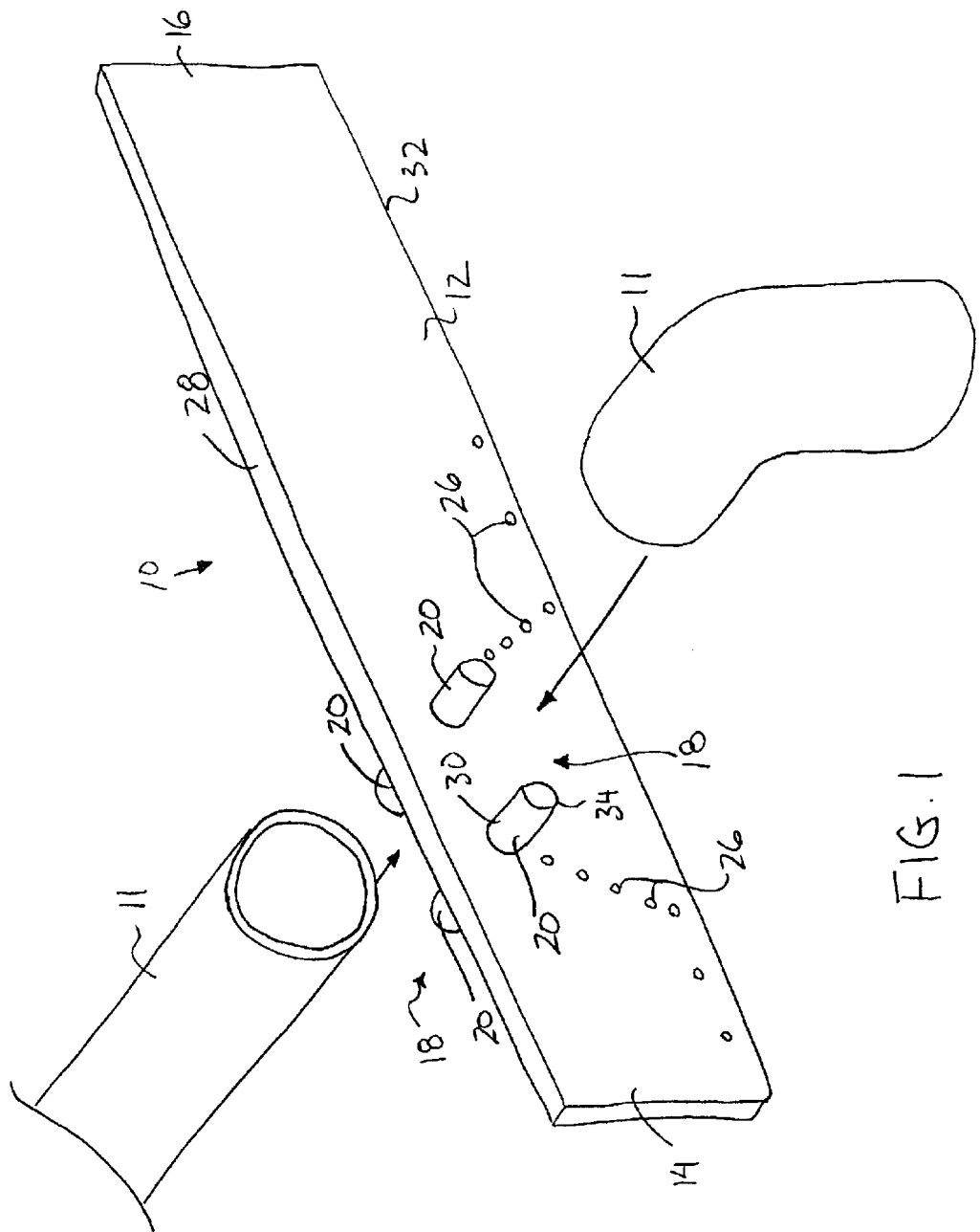
FIG. 1 is an isometric view of the pipe aligning tool.
Figure 3:
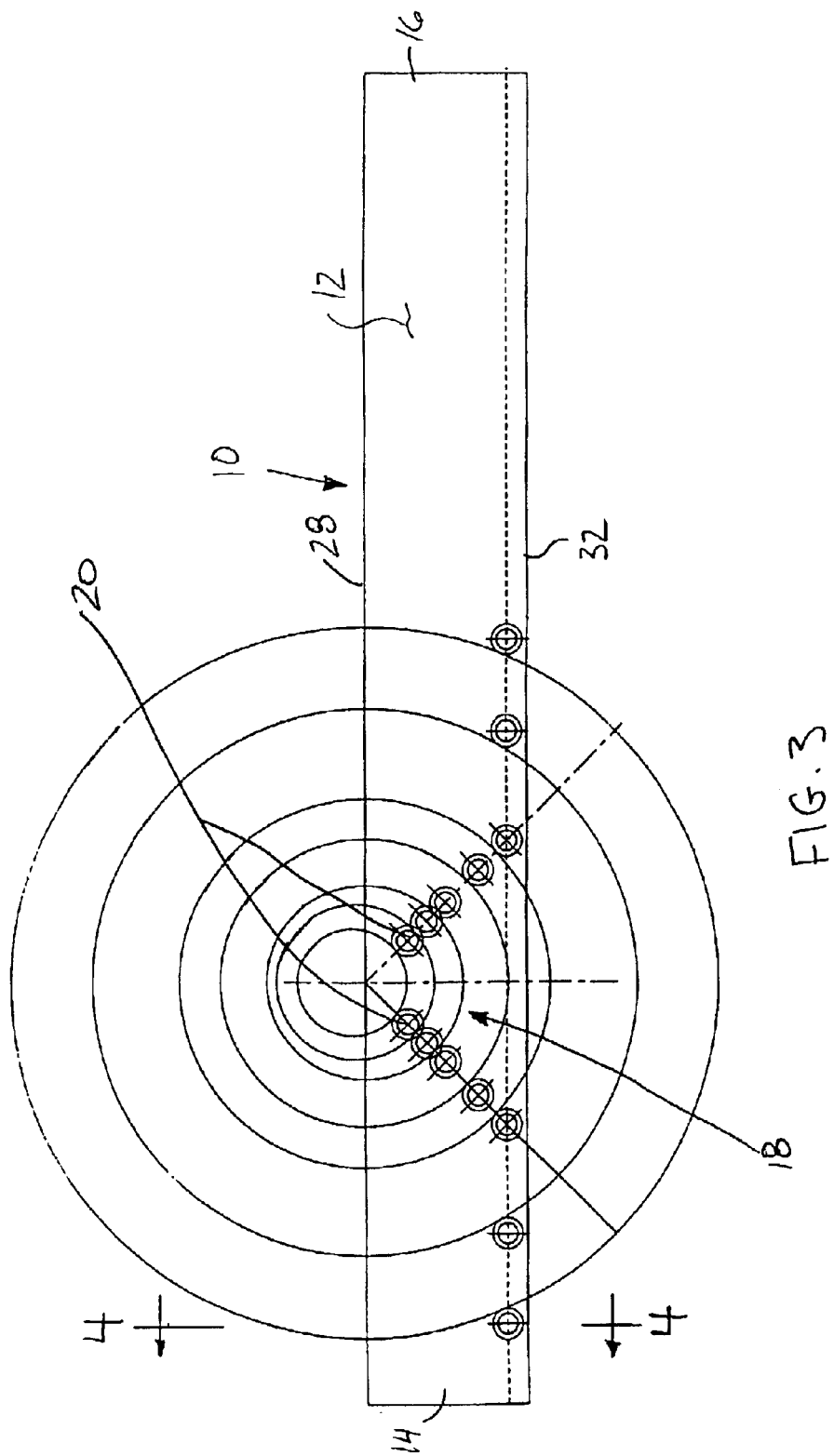
FIG. 3 is a side elevational view of the tool according to FIG. 1.
Figure 5:
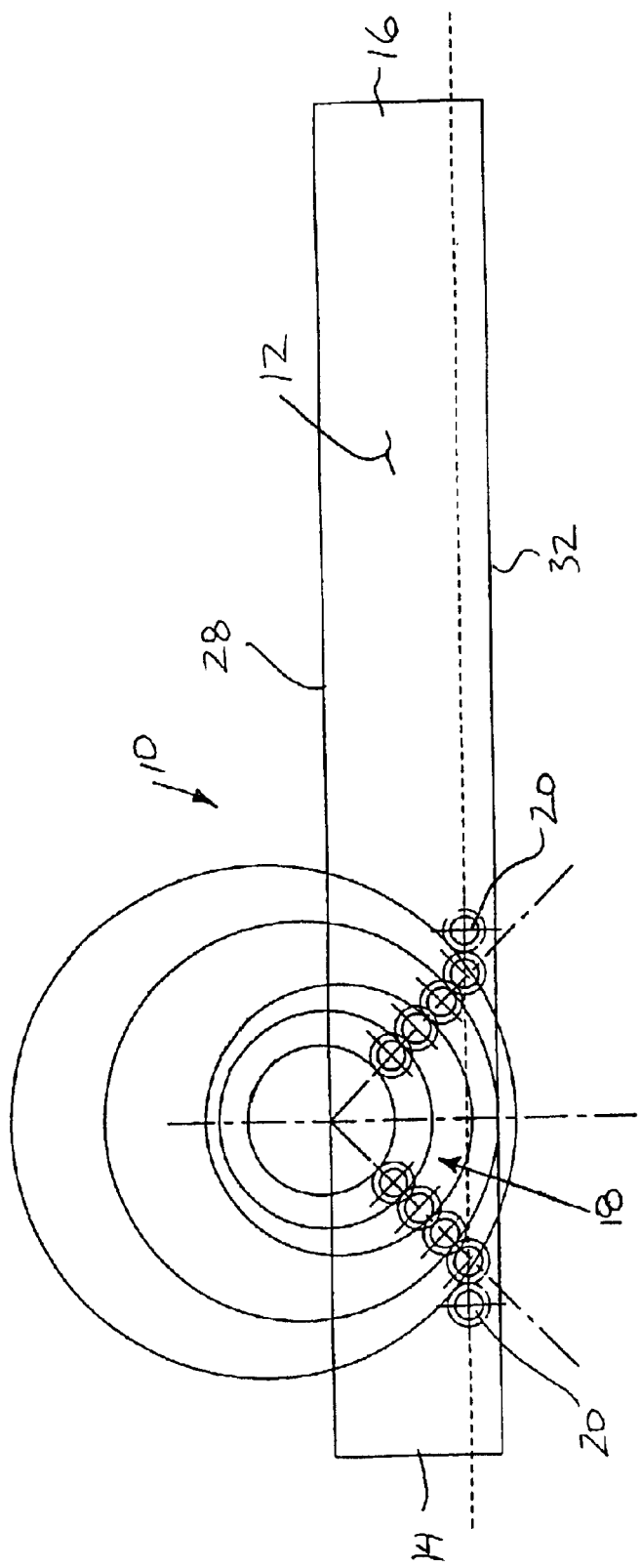
FIG. 5 is a side elevational view of a further embodiment of the tool having differing dimensions for use in different pipe size applications.

Referring to the accompanying drawings, there is illustrated a pipe aligning tool generally indicated at reference numeral 10. The tool 10 is particularly useful in aligning two abutting piping components 11 of a piping spool in an end to end, concentric configuration until the piping components 11 can be secured together by a welder by suitable tacking. A piping spool is herein understood to comprise a string of piping components, both straight and curved, as well as fittings including flanges, elbows, intersections and the like, which are assembled to form continuous piping with welded joints.

As noted above, the abutted components 11 of the piping spool for which the tool may be used include elongate straight piping components, flanges, curved fittings, intersections such as T fittings, or caps and the like. In use, one person holds the abutted components in alignment using the tool 10 while another person tack welds the abutted components together at which point the tool is no longer needed to finish welding the piping components together in proper alignment with one another. After the initial tack, the tool 10 is removed.

The tool 10 includes a spacer 12 in the form of a flat elongate rectangular plate formed of rigid material having constant thickness which extends from a working end 14 to a handle end 16 thereof. The flat configuration of the spacer 12 lies entirely within a plane of the spacer. Thickness of the spacer may be between $1/16$ of an inch and $5/32$ of an inch, however ideally the thickness is between $3/32$ of an inch and $1/8$ of an inch to provide a suitable spacing between the piping components to be welded together.

A pair of pipe locators 18 are provided on respective opposing sides of the spacer 12 in alignment with one another for engaging the periphery of respective piping components on opposing sides of the spacer 12 for concentric alignment of the piping components. Each pipe locator 18 generally comprises two projections 20 at spaced positions on the spacer 12 for engaging the periphery of respective piping components at spaced locations thereabout so that each piping component is supported partway about one side of its periphery for both vertical and horizontal alignment with an opposing piping component.

Each projection 20 is cylindrical in shape and projects outwardly from a respective side of the spacer 12 perpendicularly to the plane of the spacer, concentrically with a respective projection on an opposing side of the spacer so that the projections are parallel to one another. Each projection 20 is commonly mounted to the spacer 12 with the respective opposing projection on the opposite side of the spacer by a common threaded insert 22 to which both projections on opposing sides of the spacer are threadably secured. Each projection comprises a cap which is internally threaded for securement to a respective end 24 of the insert 22 which is externally threaded. For regular use of the tool with straight piping components of consistent diameter and with some curved piping components, the projections 20 on opposing sides of the spacer 12 can have identical dimensions of diameter and length without interference with variations in size and curvature of the outer surface of the piping components.

Figure 6:
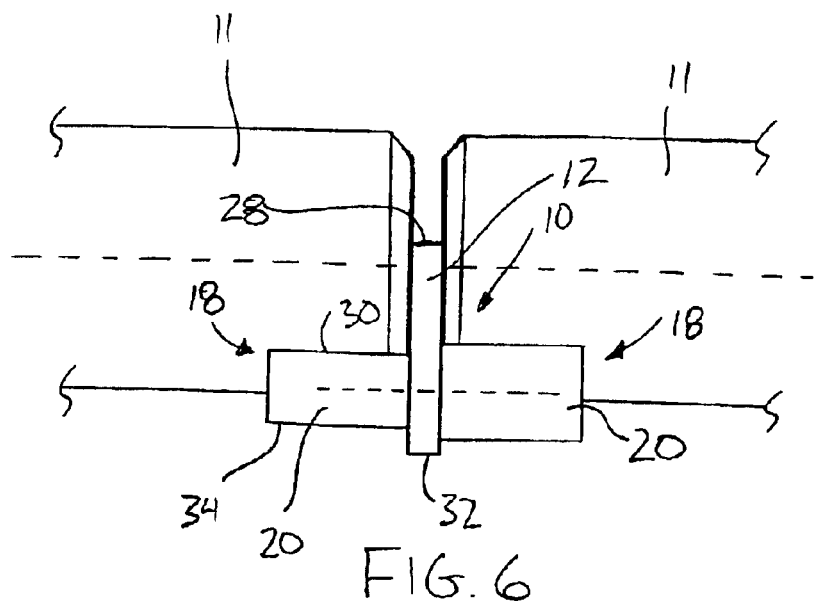
FIG. 6 is an end elevational view of the tool when two piping components of similar designated diameters but with slight variations in actual dimensions are to be aligned concentrically.

Due to the common threaded mounting of the projections 20, the projections can readily be unthreaded and replaced with different size caps having either different diameter or different length. In the example of FIG. 6, in rare instances the external diameter of one pipe component from one manufacturer may vary by ⅛ of an inch, for example, from a similarly standard sized piping component from a different manufacturer, but concentric alignment of the piping components is still desired to produce an even welded bead about a full circumference of the welded joint between the piping components. In this instance as illustrated in FIG. 6, the projections on one side only of the tool may be replaced with pins, each having a diameter which is ¹⁄₁₆ of an inch greater so that supporting the smaller of the two piping components on the larger diameter projections enables two opposed piping components on opposite sides of the spacer 12 to remain concentrically aligned when engaged with the projections even when diameter between the two piping components varies by ⅛ of an inch. In the example of FIG. 6, the smaller diameter projections are ⅜ of an inch while the larger projections are ⁷⁄₁₆ of an inch in diameter.

In another example, as illustrated in FIG. 2, one of the piping components may comprise a curved fitting which might not sit properly against the projections when abutted with the spacer 12 if the projections project to a greater distance outward from the spacer 12 than a radius of curvature of the piping components permits. A similar problem might occur when one of the piping components comprises a flange having a stepped outer surface. A greater depth of the projection is still preferred on the opposing side of the spacer 12 where a straight piping component is abutted to improve accuracy of alignment of the tool 10 with respect to the piping components. As illustrated in the example of FIG. 2, the shorter projection 20 is only 1 centimeters in depth from the spacer 12, while the opposing side projections are 2 centimeters in length for improved accuracy in alignment.

Figure 7:
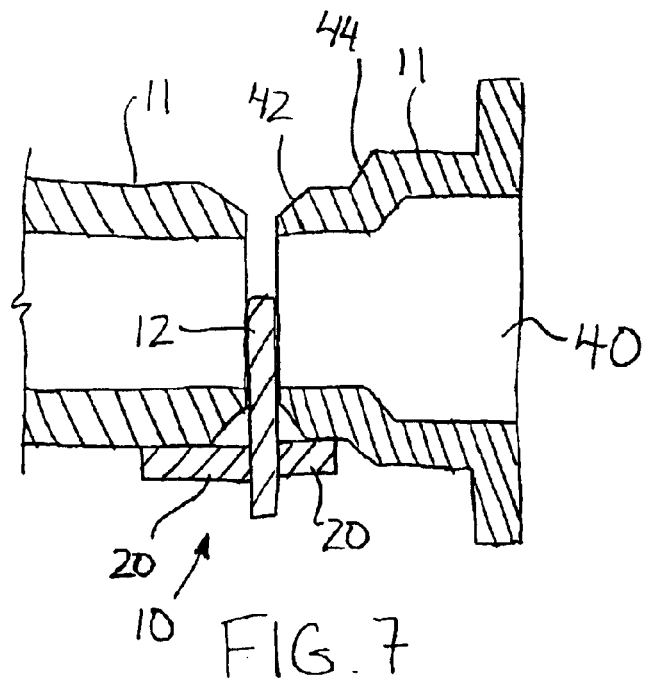
FIG. 7 is a sectional view of a flange abutted against one side of the spacer for alignment with a straight pipe section on the other side of the spacer.

In a further example, as illustrated in FIG. 7, the tool is used for alignment of a flange 40 with a straight piping component. The flange 40 includes an outer periphery which includes a bevel 42 at a free end, similarly to conventional straight and curved piping components, and an outer surface which typically includes a shoulder 44 in which the outer diameter increases at a position spaced from the free end. For proper alignment of the flange 40 with the straight piping component, the projections 20 on a side of the tool which the flange abuts have a length which is suitable for engagement of the projections with the outer surface of the flange between the bevel 42 and the shoulder 44 when the flange abuts the spacer. For clearance of the bevel of the flange, the projections 20 on that side of the spacer are ideally at least one centimeters in length. The projections 20 also have a maximum length of 14 millimeters to prevent engagement with the increased diameter of the flange which would interfere with alignment of the flange with a straight piping component or curved piping component to which it is to be welded.

The spacer 12 supports the threaded insert mounting the projections thereon to extend through respective apertures 26 extending through the spacer 12 between the opposing sides thereof. The apertures are provided at varying spacings relative to one another for supporting the projections therein at various locations, with the spacer spanning between and beyond the two projections on each side of the spacer in each instance.

The apertures are located in pairs in which each aperture of each pair is located at a constant spacing from an inner edge 28 of the spacer with respect to the other aperture of the pair. The inner edge 28 of the spacer generally comprises the edge which an inner side 30 of each projection faces when the inner side 30 comprises the side of the projections which engages the periphery of a piping component in use. Similarly the outer edge 32 of the spacer comprises an edge of the spacer opposite to the inner edge which the outer side 34 of the projections face opposite the inner sides engaged with the piping components in use.

Each pair of apertures 26 is located at a different spacing from the inner edge 28 of the spacer with the apertures of the pairs having increasing spacing from the inner edge as spacing between the apertures within each pair similarly increases. The last few pairs having the greatest spacing of apertures therebetween are located at the same distance from both inner and outer edges while being positioned closest to the outer edge for minimizing the required width of the spacer 12.

In use, a first piping component of two components to be welded together is abutted against one side of the spacer 12 and then aligned with the spacer by engaging a periphery of the first piping component with both projections of the pipe locator on the same side of the spacer with which the first piping component is abutted. A second piping component is then similarly abutted at its end with the opposing side of the spacer and subsequently is aligned concentrically with the first piping component by engaging the periphery of the second piping component with both projections of the pipe locator on that same side of the spacer that the second piping component abuts. When the piping components are abutted in alignment with the tool, they remain freely rotatable about a respective longitudinal axis in relation to each other and the tool for orienting the piping components in relation to each other in the aligned position thereof.

Before abutment of the piping components with the spacer, a spacing between the projections of each pipe locator may be adjusted to accommodate the diameter of the piping components to be welded. The spacing between the projections of each pipe locator is preferably adjusted within a range between a radius and a diameter of the piping components to be welded. In the event that the two piping components do not have identical diameters, varying diameters of projections may be used before alignment as described and illustrated with regard to FIG. 6. Shorter projections may similarly be replaced when required for curved piping components and the like, also as noted above.

While some embodiments of the present invention have been described in the foregoing, it is to be understood that other embodiments are possible within the scope of the invention. For instance, the spacer may comprise a plurality of non-continuous elements lying within the plane of the spacer or the projections of the pipe locators may be arranged so that only one of the projections is moved to adjust the spacing therebetween. The opposing projections themselves may be two continuous and parallel members while the spacer comprises plural elements supported in a common plane between respective ends of the continuous members, perpendicularly thereto. The invention is to be considered limited solely by the scope of the appended claims.

What is claimed is:

1. A pipe alignment tool for alignment of two adjacent piping components of a spool of piping components to be welded together, the tool comprising:
   a planar spacer which is contained within a spacer plane so as to be arranged for abutment between respective ends of the piping components; and
   a pipe locator supported on each side of the spacer, each pipe locator comprising a pair projections spaced apart on the spacer plane from one another and projecting outwardly from the spacer plane, transversely thereto, the projections on one side of the spacer being concentrically aligned with the respective projections on the opposing side of the spacer.

2. The tool according to claim 1 wherein each pipe locator is arranged to engage partway about an external periphery of a respective one of the piping components.

3. The tool according to claim 1 wherein the spacer spans the pair of projections on each side thereof.

4. A pipe alignment tool for alignment of two adjacent piping components of a spool of piping components to be welded together, the tool comprising:
   a planar spacer comprising a flat plate member which is contained within a spacer plane so as to be arranged for abutment between respective ends of the piping components; and
   a pipe locator supported on each aide of the flat plate member, each pipe locator comprising a pair of projections spaced apart on the flat plate member from one another and projecting outwardly from the spacer plane, transversely thereto, the projections on one side of the spacer being substantially aligned with the respective projections on the opposing side of the spacer.

5. The tool according to claim 1 wherein the projections are generally cylindrical in shape and the projections on one side of the spacer have a varying diameter in relation to the projections on the opposing side of the spacer.

6. A pipe alignment tool for alignment of two adjacent piping components of a spool of piping components to be welded together, the tool comprising:
   a planar spacer which is contained within a spacer plane so as to be arranged for abutment between respective ends of the piping components; and
   a pipe locator supported on each side of the spacer, each aloe locator comprising a pair of projections spaced apart on the spacer plane from one another and projecting outwardly from the spacer plane, transversely thereto, the projections on one side of the spacer being concentrically aligned with the respective projections on the opposing side of the spacer;
   the projections of each pair of projections being adjustable in spacing relative to one another.

7. The tool according to claim 1 wherein the projections include an inner side for engaging a respective piping component which faces an inner edge of the spacer and an outer aide opposite the inner side which faces an outer edge of the spacer, mounting of the projections being arranged such that spacing from the inner edge of the spacer increases as spacing between the projections within each pair of projections increases.

8. The tool according to claim 6 wherein the projections are secured to the spacer by threaded fasteners so as to be selectively separable.

9. The tool according to claim 8 wherein the pipe locators on opposing sides of the spacer are commonly mounted.

10. The tool according to claim 1 wherein the pipe locators on opposing sides of the spacer project outward at different distances from the spacer.

11. The tool according to claim 1 wherein the pipe locator on at least one side of the spacer projects substantially perpendicularly outward from the spacer a distance, which is generally between 10 millimeters and 14 millimeters from the spacer.

12. The tool according to claim 1 wherein the spacer has a thickness generally in the range between $\frac{1}{16}$ of an inch and $\frac{5}{32}$ of an inch.

13. A method of aligning two adjacent piping components of a spool of piping components to be welded together, the method comprising:
   providing an alignment tool having a spacer which is contained within a spacer plane and pipe locators projecting outward from respective sides of the spacer transversely to the spacer plane, in respective alignment with one another,
   abutting an end of a first piping component against one side of the spacer;
   engaging an external periphery of the first piping component with the respective pipe locator on the same side of the spacer;
   abutting an end of a second piping component against the other side of the spacer;
   aligning the second piping component concentrically with the first piping component by engaging an external periphery of the second piping component with the respective pipe locator on the same side of the spacer;
   joining the piping components with tack welds; and
   removing the tool prior to completing a weld between the piping components.

14. The method according to claim 13 wherein the pipe locator on each side of the spacer comprises a pair of projections which extend outward from the spacer at spaced positions from one another, the method including adjusting a spacing between the projections of each pair to accommodate varying diameters of piping components.

15. The method according to claim 14 including adjusting spacing between the projections of each pair within a range between a radius and a diameter of the piping components to be welded.

16. The method according to claim 13 wherein the pipe locator on each side of the spacer comprises a pair of projections, the projections on one side of the spacer being concentrically aligned with respective projections on the other side of the spacer.

17. The method according to claim 16 including increasing diameter of the projections on one side of the spacer in relation to the other side of the spacer when the piping components designated as being the same size to be welded together vary from one another in actual diameter.

18. The method according to claim 13 wherein the pipe locator on one side of the spacer projects from the spacer a shorter distance than the pipe locator on an opposing side of the spacer and wherein the method includes abutting a piping component which is other than straight against the side of the spacer having the pipe locator which projects the shortest distance from the spacer.

19. The tool according to claim 4 wherein the projections of each pair of projections are adjustable in spacing from one another and are secured to the spacer by threaded fasteners so as to be selectively separable.

* * * * *